(12) United States Patent
Huang (10) Patent No.: US 12,114,292 B2
(45) Date of Patent: Oct. 8, 2024

(54) METHOD, DEVICE AND RADIO ACCESS NETWORK FOR ADJUSTING RESOURCES OF RADIO ACCESS NETWORK

(71) Applicant: Wistron Corporation, New Taipei (TW)

(72) Inventor: Yuan-Fu Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 372 days.

(21) Appl. No.: 17/829,370

(22) Filed: Jun. 1, 2022

(65) Prior Publication Data

US 2023/0292291 A1 Sep. 14, 2023

(30) Foreign Application Priority Data

Mar. 9, 2022 (TW) .................................. 111108476

(51) Int. Cl.
*H04W 72/04* (2023.01)
*H04W 16/22* (2009.01)

(52) U.S. Cl.
CPC ........... *H04W 72/04* (2013.01); *H04W 16/22* (2013.01)

(58) Field of Classification Search
CPC ... H04W 72/04; H04W 16/22; H04W 88/085; H04W 24/02; H04W 28/16; G06N 3/063; G06N 3/08; G06N 3/0442
See application file for complete search history.

(56) References Cited

U.S. PATENT DOCUMENTS

| 11,575,583 | B2 * | 2/2023 | Hooli | H04L 41/0823 |
| 11,582,757 | B2 * | 2/2023 | Cui | H04W 64/006 |
| 2021/0258866 | A1 | 8/2021 | Chou | |

OTHER PUBLICATIONS

Solmaz Niknam et al., "Intelligent O-RAN for Beyond 5G and 6G Wireless Networks", May 17, 2020, <Electrical Engineering and Systems Science—Signal Processing (eess.SP)>.
ETSI, "5G; Management and orchestration; 5G performance measurements", Aug. 2020, ETSI TS 128 552 V16.6.0.

* cited by examiner

*Primary Examiner* — Kabir A Timory
(74) *Attorney, Agent, or Firm* — Winston Hsu (57) ABSTRACT

A resource adjustment method for a radio access network includes obtaining a plurality of radio access network training information at a first time point; predicting a radio access network usage condition of a second time point according to the plurality of radio access network training information; and pre-adjusting the radio access network resource allocation of the second time point according to the radio access network usage condition at a third time point, so as to allocate a plurality of user equipments to a plurality of radio units and adjust an arrangement of computing resources of a distributed unit and a central unit; wherein the first time point is earlier than the third time point, and the third time point is earlier than the second time point.

20 Claims, 7 Drawing Sheets

METHOD, DEVICE AND RADIO ACCESS NETWORK FOR ADJUSTING RESOURCES OF RADIO ACCESS NETWORK

BACKGROUND OF THE INVENTION

1. Field of the Invention

The present invention relates to a method, device and related radio access network for adjusting resources of a radio access network, and more particularly, to a method, device and related radio access network for self-adaptively adjusting resources of a radio access network complying with the specifications of an open radio access network (O-RAN) of the $5^{th}$ generation mobile communication system (5G).

2. Description of the Prior Art $5^{th}$ generation mobile communication system (5G) is a new generation of the mobile communication technology and a successor of the fourth generation mobile communication technology (4G), which aims to achieve higher transmission rates, lower latency, larger capacity, lower costs, and more energy savings. Therefore, International Telecommunication Union (ITU) has defined three main application areas of 5G, namely enhanced mobile broadband (eMBB), ultra-reliable and low latency communications (uRLLC) and massive machine type communications (mMTC).

In response to diversified and massive demands for 5G network, the industry has proposed Open Radio Access Network (O-RAN) in order to increase the flexibility of 5G architecture and provide intelligent management methods. Through open interfaces, open hardware and open sources, O-RAN enables 5G radio access network (RAN) to be deployed on an open platform and achieve automatic and efficient resource arrangement with artificial intelligence technology.

With the increasing complexity and diversity of the RAN architectures, how to optimally arrange wireless network resources is one of the most important issues for administrators to consider. In addition to ensuring the network quality of user equipments, the administrators also need to consider the revenue of telecom operators, including transmission delay, network congestion, abnormal detection and power consumption, all of which are issues in the field.

SUMMARY OF THE INVENTION

Therefore, the present invention is to provide a method to predict the future usage of RAN resources according to the past usage of RAN resources and pre-adjust the arrangement of the RAN resources according to the predicted results, so as to improve drawbacks of the prior art.

An embodiment of the present invention discloses a resource adjustment method for a radio access network (RAN), wherein the RAN complies with a specification of an open radio access network (O-RAN) of a $5^{th}$ generation mobile communication system (5G) and comprises a plurality of radio units (RU), a distributed unit (DU) and a central unit (CU). The resource adjustment method comprises obtaining a plurality of RAN training information at a first time point; predicting a RAN usage condition of a second time point according to the plurality of RAN training information; and pre-adjusting a RAN resource allocation of the second time point according to the RAN usage condition at a third time point, so as to allocate a plurality of user equipments (UE) to the plurality of RUs and adjust an arrangement of computing resources of the DU and the CU; wherein the first time point is earlier than the third time point, and the third time point is earlier than the second time point.

An embodiment of the present invention discloses a resource adjustment device for a radio access network (RAN), wherein the RAN complies with a specification of an open radio access network (O-RAN) of a $5^{th}$ generation mobile communication system (5G) and comprises a plurality of radio units (RU), a distributed unit (DU) and a central unit (CU). The resource adjustment device comprises a processing unit, configured to execute a program code; and a storage unit, coupled to the processing unit to store the program code, wherein the program code is configured to instruct the processing unit to execute a resource adjustment method. The resource adjustment method comprises obtaining a plurality of RAN training information at a first time point; predicting a RAN usage condition of a second time point according to the plurality of RAN training information; and pre-adjusting a RAN resource allocation of the second time point according to the RAN usage condition at a third time point, so as to allocate a plurality of user equipments (UE) to the plurality of RUs and adjust an arrangement of computing resources of the DU and the CU; wherein the first time point is earlier than the third time point, and the third time point is earlier than the second time point.

An embodiment of the present invention discloses a radio access network (RAN), wherein the RAN complies with a specification of an open radio access network (O-RAN) of a $5^{th}$ generation mobile communication system (5G) and comprises a plurality of radio units (RU); a distributed unit (DU), running on a first O-Cloud platform; a central unit (CU), running on a second O-Cloud platform; and a resource adjustment device, configured to execute a resource adjustment method for the radio access network. The resource adjustment method comprises obtaining a plurality of RAN training information at a first time point; predicting a RAN usage condition of a second time point according to the plurality of RAN training information; and pre-adjusting a RAN resource allocation of the second time point according to the RAN usage condition at a third time point, so as to allocate a plurality of user equipments (UE) to the plurality of RUs and adjust an arrangement of computing resources of the DU and the CU; wherein the first time point is earlier than the third time point, and the third time point is earlier than the second time point.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
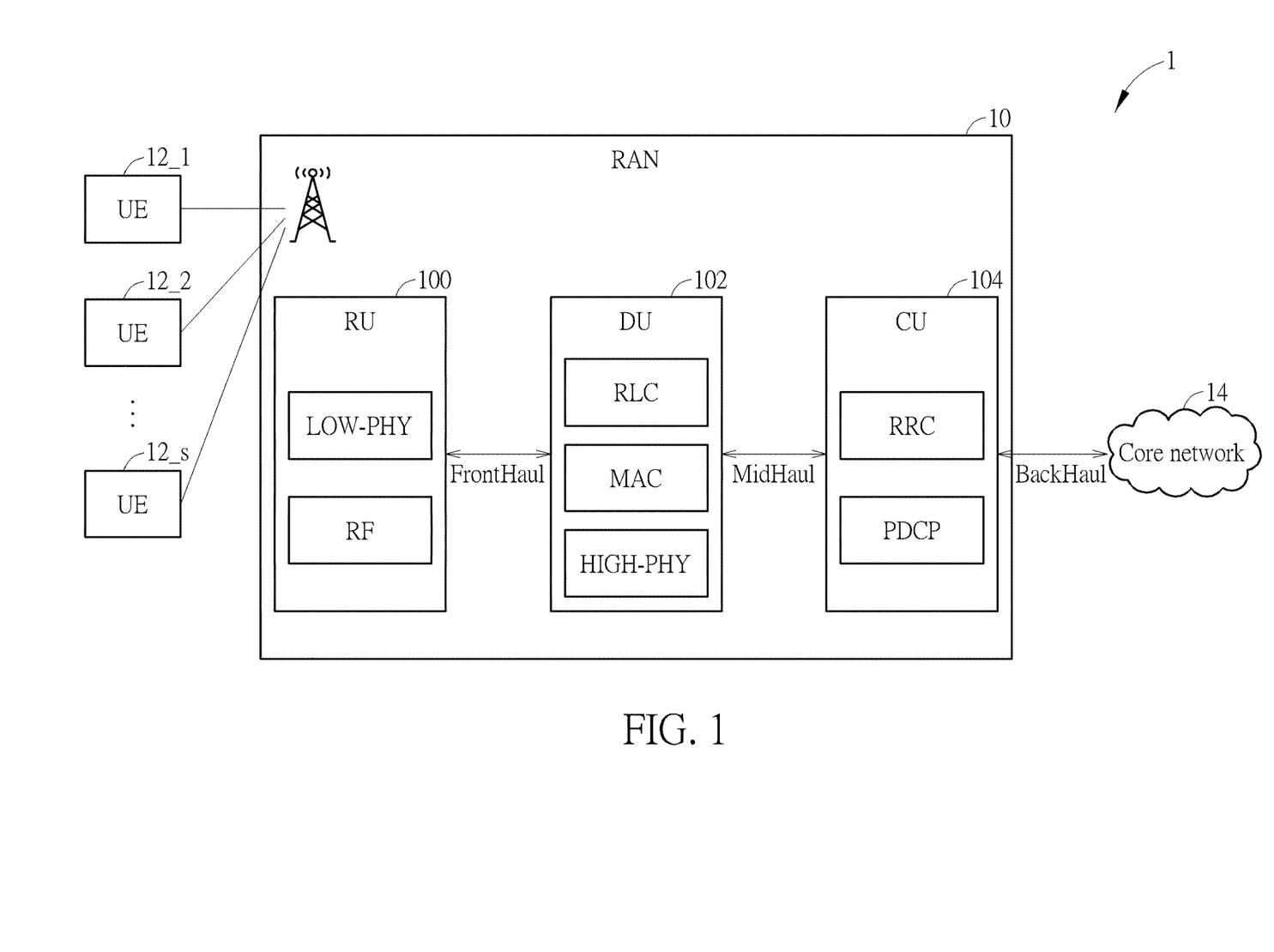
FIG. 1 is a schematic diagram of a mobile communication system.

Please refer to FIG. 1, which is a schematic diagram of a mobile communication system 1. The mobile communication system 1 complies with 5G specifications and generally comprises a radio access network (RAN) 10, a plurality of UEs 12_1-12_s and a core network 14. The RAN 10 comprises a plurality of radio units (RUs), a plurality of distributed units (DUs), and a plurality of central units (CUs); for the sake of simplicity, FIG. 1 only shows an RU 100, a DU 102 and a CU 104 thereof. The PAN 10 is set between the plurality of UEs 12_1-12_s and the core network 14, and the UEs 12_1-12_s establish wireless network connections with the core network 14 through the RAN 10. In detail, when the UEs 12_1-12_s send 5G signals, the signals are received by the RU 100, passed through the DU 102 and the CU 104, and finally transmitted to the core network 14. During this process, the RU 100 processes radio frequency (RF) and low-level physical layer (Low-PHY) data, and is connected to the DU 102 through fronthaul; the DU 102 is in charge of processing high-level physical layer (High-PHY) data and Layer 2 (OSI L2) related protocols such as Media Access Control (MAC), Radio Link Control (RLC), etc., and is connected to the CU 104 through midHaul; the CU 104 is in charge of processing high-level protocols such as Radio Resource Control (RRC) Service Data Adaptation Protocol (SDAP), Packet Data Convergence Protocol (PDCP), etc., and is connected to the core network 14 through backHaul.

The network traffic of a PAN depends on the number of connections of the user equipments. Therefore, the volume of RAN transmissions fluctuates with different time points and different number of connections, and based on different tasks of each unit in the PAN, the amount of data to be processed and the amount of computing resources required are even more different. In general, the time point when network congestion may occur in the future may be predicted by collecting network transmission information and thereby training artificial intelligence (AI) model, and network congestion may be solved by transferring (handing over) user equipments to other RUs. However, the above-mentioned method only considers the rearrangement of fronthaul radio resources, but does not consider that the network congestion may be caused by insufficient computing capability, such as capability of the DU to process baseband, or the capability of the CU to process network layer 3 (OSI L3) related protocols and so on. In addition, when there are excess computer resources, the excess resources must be recovered to optimize the allocation of network resources and so as to achieve the purpose of energy saving and cost reduction.

In order to solve the above problems, the present invention provides a PAN, which may adaptively adjust the resources of the PAN.

Figure 2:
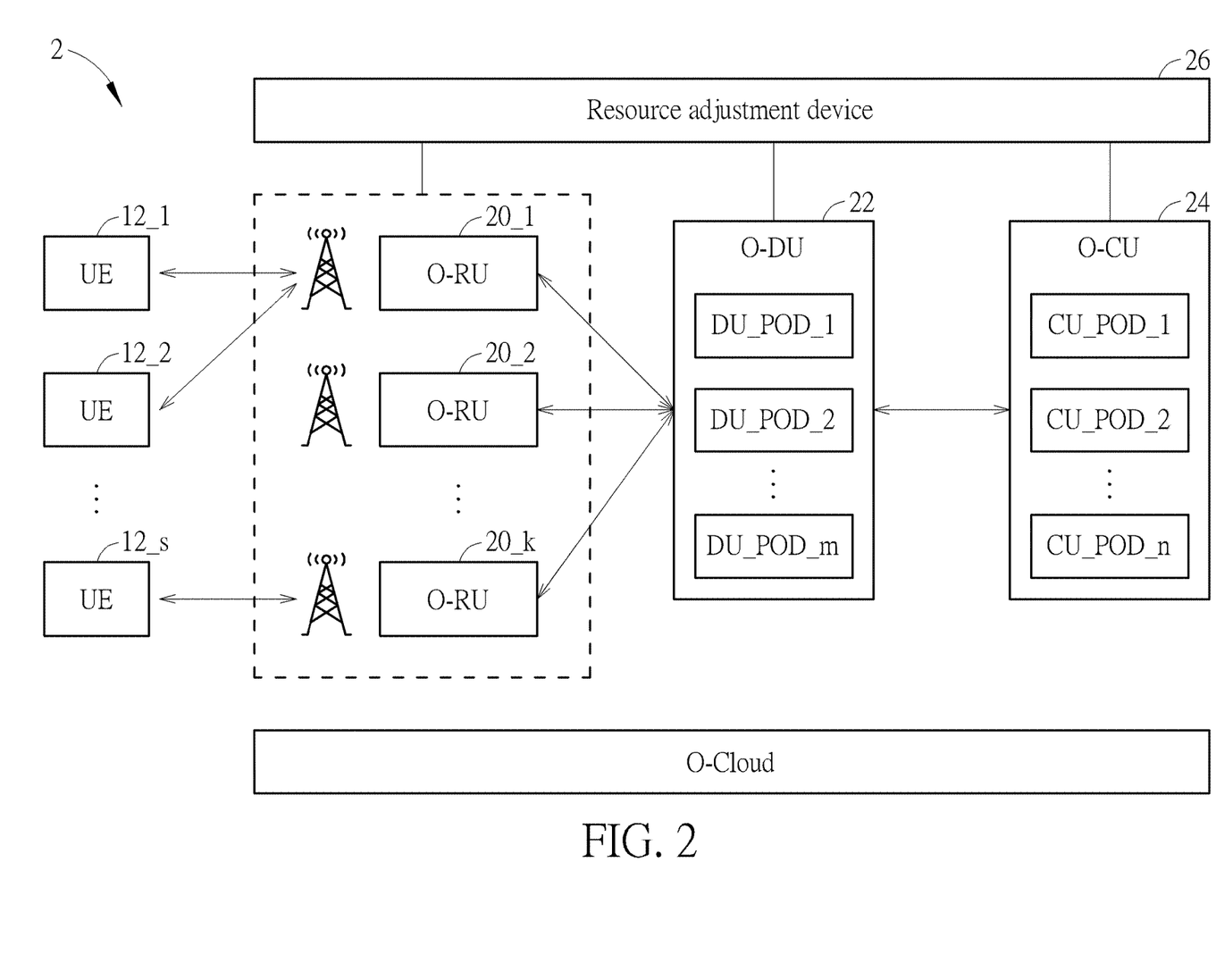
FIG. 2 is a schematic diagram of a radio access network according to an embodiment of the present invention.

Please refer to FIG. 2, which is a schematic diagram of a RAN 2 according to an embodiment of the present invention. The PAN 2 may be used in the mobile communication system 1 to implement the RAN 10, and the PAN 2 complies with the O-RAN specifications. The PAN 2 comprises a plurality of open radio units (O-RUs) 20_1-20_k, an open distributed unit (O-DU) 22, an open central unit (O-CU) 24 and a resource adjustment device 26. The plurality of O-RUs 20_1-20_k wirelessly connect with the plurality of UEs 12_1-12_s, and are shown as the same block (dotted line) for simplicity. The O-DU 22, the O-CU 24 and the resource adjustment device 26 run on an O-Cloud platform according to the O-RAN specifications. Meanwhile, in this embodiment, the O-DU 22 and the O-CU 24 run as a container network function (CNF) with a plurality of Pods (containers) on Kubernetes; for example, the O-DU 22 is jointly run by a plurality of containers DU_POD_1-DU_POD_m with a total of m Pods, while the O-CU 24 is jointly run by a plurality of containers CU_POD_1-CU_POD_n with a total of n Pods, but not limited thereto. Those skilled in the art may adopt other appropriate cloud-native platforms according to different requirements.

Note that, FIG. 2 only shows the single O-DU 22 and the single O-CU 24, which is, however, for illustrative purpose. In practical applications, the PAN 2 may contain a plurality of DUs and a plurality of CUs. On the other hand, the UEs 12_1-12_s and the O-RUs 20_1-20_k are not limited to be plural, and may respectively be single. Moreover, according to the 5G specifications, a PAN may have various deployment types. The RUs, the DUs, and the CUs may be deployed independently or in combination (as a monolithic unit), and the DUs and the CUs may also be deployed in a centralized manner. For simplicity, the figures only show the most simplified structure. However, the various deployment types of the PAN as described above are also applicable to the present invention, and may be changed and modified according to requirements.

Figure 3:
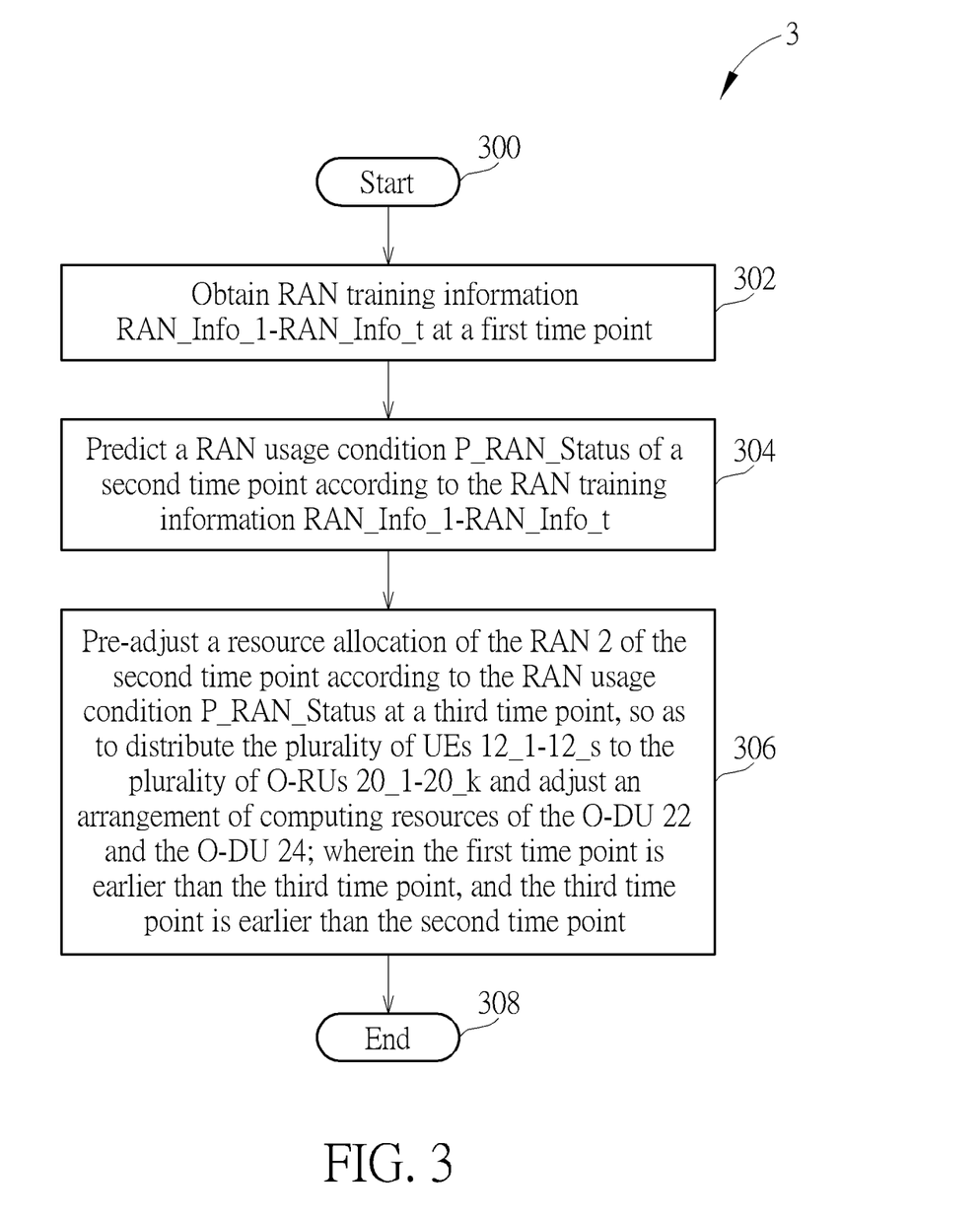
FIG. 3 is a schematic diagram of a process according to an embodiment of the present invention.

The resource adjustment device 26 logically comprises a Service Management and Orchestration (SMO), a Non-Real Time RAN Intelligent Controller (Non-RT RIC) and a Near-RT RAN Intelligent Controller (Near-RT RIC) complying with the O-RAN specifications, and may manage the resources of the PAN 2 according to a resource adjustment method for PAN. The resource adjustment method for PAN may be summarized into a process 3 as shown in FIG. 3. The process 3 comprises the following steps:

Step 300: Start.

Step 302: Obtain RAN training information RAN_Info_1-RAN_Info_t at a first time point.

Step 304: Predict a RAN usage condition P_RAN_Status of a second time point according to the RAN training information RAN_Info_1-RAN_Info_t.

Step 306: Pre-adjust a resource allocation of the RAN 2 of the second time point according to the PAN usage condition P_RAN_Status at a third time point, so as to distribute the plurality of UEs 12_1-12_s to the plurality of O-RUs 20_1-20_k and adjust an arrangement of computing resources of the O-DU 22 and the O-DU 24; wherein the first time point is earlier than the third time point, and the third time point is earlier than the second time point.

Step 308: End.

In the process 3, the first time point is earlier than the third time point, and the third time point is earlier than the second time point. In other words, according to the process 3, the resource adjustment device 26 obtains the past usage of the RAN resources at the first time point as the RAN training information RAN_Info_1-RAN_Info_t (Step 302), uses methods of machine learning to train artificial intelligence (AI) models and use the AI models to predict the PAN usage condition P_RAN_Status of the second time point in the future (Step 304), and pre-adjusts the resource allocation of PAN 2 of the second time point (in the future) according to the predicted PAN usage condition P_RAN_Status at the third time point (before the second time point). Accordingly, the resource adjustment device 26 may keep monitoring the PAN 2 and adaptively adjusting the resource allocation of the RAN 2.

In detail, the RAN training information RAN_Info_1-RAN_Info_t obtained by the resource adjustment device 26 in Step 302 are time series composed of vectors including a plurality of features, and the plurality of features of each vector include radio resource data RR_Metrics and computing resource data CR_Metrics. In an embodiment, the features included in the radio resource data RR_Metrics are shown in Table 1 below, the features and corresponding measurement names are specified in 3GPP TS 28.552 (Management and orchestration; 5G performance measurements), so the content is not repeated, and those skilled in the art may understand the meanings. The Non-RT RIC of the resource adjustment device 26 may obtain any feature values of the radio resource data RR_Metrics by SMO through O1 interface of O-RAN.

TABLE 1

| RR_Metrics | |
|---|---|
| Feature | Measurement name |
| Radio Resource Utilization | |
| DL Total PRB Usage | RRU.PrbTotDl |
| UL Total PRB Usage | RRU.PrbTotUl |
| Distribution of DL Total PRB Usage | RRU.PrbTotDlDist.BinX |
| Distribution of UL Total PRB Usage | RRU.PrbTotUlDist.BinX |
| DL PRB Used for Data Traffic | RRU.PrbUsedDl |
| DL Total Available PRB | RRU.PrbAvailDl |
| UL PRB Used for Data Traffic | RRU.PrbUsedUl |
| UL Total Available PRB | RRU.PrbAvailUl |
| UE Throughput | |
| Average DL UE Throughput in gNB | DRB.UEThpDl |
| Distribution of DL UE Throughput in gNB | DRB.UEThpDlDist.Bin |
| Average UL UE Throughput in gNB | DRB.UEThpUl |
| Distribution of UL UE Throughput in gNB | DRB.UEThpUlDist.Bin |
| Percentage of Unrestricted DL UE Data Volume in gNB | DRB.UEUnresVolDl |
| Percentage of Unrestricted UL UE Data Volume in gNB | DRB.UEUnresVolUl |
| RRC Connection number | |
| Mean Number of Stored Inactive RRC Connections | RRC.InactiveConnMean |
| Max Number of Stored Inactive RRC Connections | RRC.InactiveConnMax |
| PEE Measurements for PNF Power Consumption | |
| Average Power | PEE.AvgPower |
| Minimum Power | PEE.MinPower |
| PNF Energy Consumption | PEE.Energy |
| PEE Measurements for PNF Temperature | |
| Average Temperature | PEE.AvgTemperature |
| Minimum Temperature | PEE.MinTemperature |
| Maximum Temperature | PEE.MaxTemperature |
| PEE Measurements for PNF Voltage | |
| PNF Voltage | PEE.Voltage |
| PEE Measurements for PNF Current | |
| PNF Current | PEE.Current |

TABLE 1-continued

| RR_Metrics | |
|---|---|
| Feature | Measurement name |
| RSRP Measurement | |
| SS-RSRP Distribution per SSB | L1M.SS-RSRP.BinX |
| Number of Active UEs | |
| Number of Active UEs in the DL per Cell | DRB.MeanActiveUeDl |
| Number of Active UEs in the UL per Cell | DRB.MeanActiveUeUl |
| Packet Loss Rate | |
| UL PDCP SDU Loss Rate | DRB.PacketLossRateUl |
| UL F1-U Packet Loss Rate | DRB.F1UpacketLossRateUl |
| DL F1-U Packet Loss Rate | DRB.F1UpacketLossRateDl |
| Packet Drop Rate | |
| DL PDCP SDU Drop Rate in gNB-CU-UP | DRB.PdcpPacketDropRateDl |
| DL Packet Drop Rate in gNB-DU | DRB.RlcPacketDropRateDl |
| Packet Delay | |
| Average Delay DL in CU-UP | DRB.PdcpSduDelayDl |
| Average Delay DL on F1-U | DRB.PdcpF1DelayDl |
| Average Delay DL in gNB-DU | DRB.RlcSduDelayDl |
| Distribution of Delay DL in CU-UP | DRB.PdcpSduDelayDlDist.Bin.QOS |
| Distribution of Delay DL on F1-U | DRB.GtpF1DelayDlDist.Bin.QOS |
| Distribution of Delay DL in gNB-DU | DRB.RlcSduDelayDlDist.Bin.QOS |
| IP Latency Measurements | |
| Average IP Latency DL in gNB-DU | DRB.RlcSduLatencyDl |
| Distribution of IP Latency DL in gNB-DU | DRB.RlcSduLatencyDlDist.bin.QOS |
| PDCP Data Volume Measurements | |
| DL PDCP PDU Data Volume | QosFlow.PdcpPduVolumeDl_Filter |
| UP PDCP PDU Data Volume | QosFlow.PdcpPduVolumeUl_Filter |
| PDCP SDU Data Volume Measurements | |
| DL PDCP SDU Data Volume | QosFlow.PdcpSduVolumeDl_Filter |
| UL PDCP SDU Data Volume | QosFlow.PdcpSduVolumeUL_Filter |
| DL PDCP SDU Data Volume per Interface | DRB.F1uPdcpSduVolumeDl.QoS, DRB.F1uPdcpSduVolumeDl.SNSSAI, DRB.XnuPdcpSduVolumeDl.QoS, DRB.XnuPdcpSduVolumeDl.SNSSAI, DRB.X2uPdcpSduVolumeDl.QoS, DRB.X2uPdcpSduVolumeDl.SNSSAI |
| UL PDCP SDU Data Volume per Interface | DRB.F1uPdcpSduVolumeUl.QoS, DRB.F1uPdcpSduVolumeUl.SNSSAI, DRB.XnuPdcpSduVolumeUl.QoS, DRB.XnuPdcpSduVolumeUl.SNSSAI, DRB.X2uPdcpSduVolumeUl.QoS, DRB.X2uPdcpSduVolumeUl.SNSSAI |

In addition, please refer to Table 2 below for the features included in the computing resource data CR_Metrics. The CPU usage and memory usage may be obtained by Resource Metrics API which is provided by Kubernetes platform; the accelerator usage needs to be provided by vendors.

TABLE 2

| CR_Metrics | |
|---|---|
| Feature | Source |
| CPU Usage | Resource Metrics API |
| Memory Usage | Resource Metrics API |
| Accelerator Usage | Vendor |

Figure 4:
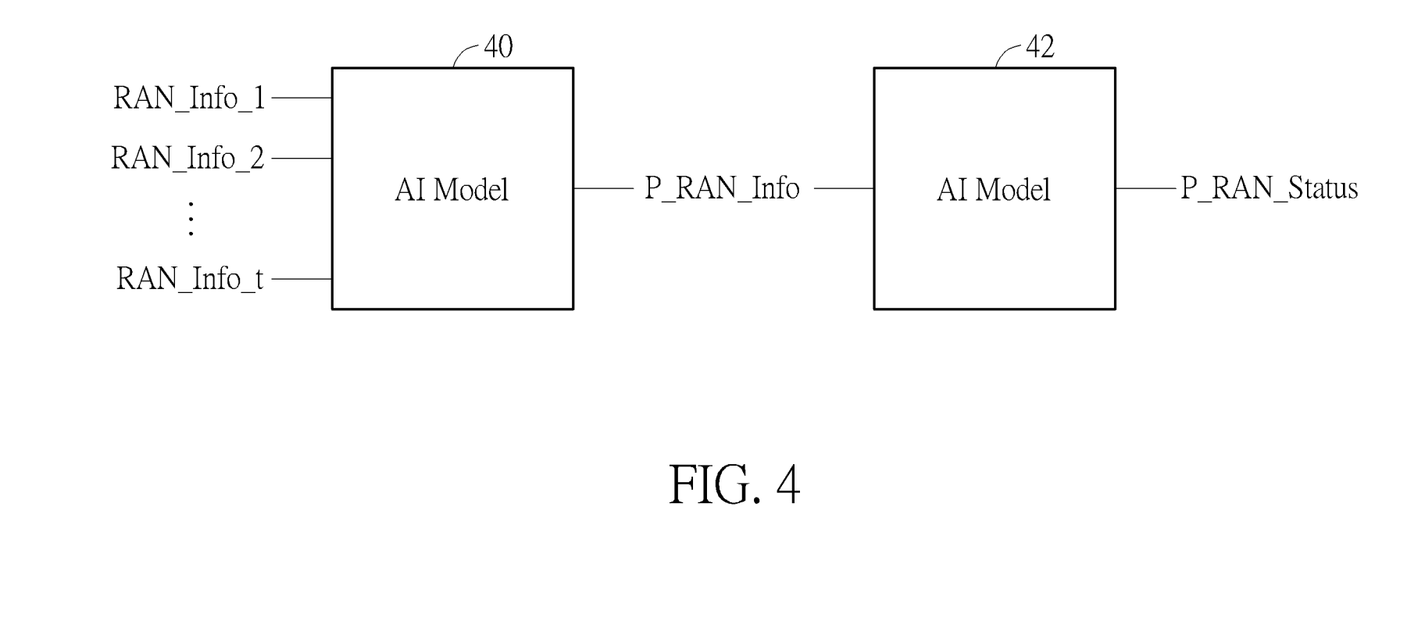
FIG. 4 is a schematic diagram of AI models according to an embodiment of the present invention.

According to the process 3, the resource adjustment device 26 predicts the RAN usage condition P_RAN_Status of the second time point according to the RAN training information RAN_Info_1-RAN_Info_t in Step 304. In an embodiment, the resource adjustment device 26 may build two-stage AI models. For example, FIG. 4 is a schematic diagram of AI models 40 and 42 applicable to the resource adjustment device 26. The AI model 40 is a long short-term memory network (LSTM), which keeps training and predicting a RAN predicting information P_RAN_Info of a future time point (e.g., time point t+1) according to the RAN training information RAN_Info_1-RAN_Info_t (of past time points 1 to t). The AI model 42 is a linear transformation model including a fully connected layer, which is trained by the plurality of RAN predicting information P_RAN_Info (of past time points 1 to t) predicted by the AI model 40, and is used to transform the RAN predicting information P_RAN_Info (of time point t+1) to the RAN usage condition P_RAN_Status. The PAN usage condition P_RAN_Status includes three target features: P_IP_Thp, P_DL_PRB_Usg and P_CPU_Usg. P_IP_Thp is related to a predicted value of the average IP throughput between the UEs and the O-RU; P_DL_PRB_Usg is related to a predicted value of the average utilization rate of downlink physical resource block (PRB) for user plane transmission; P_CPU_Usg is relative to a predicted value of CPU usage for the O-DU or the O-CU. As a result, the resource adjustment device 26 may predict the RAN usage condition P_RAN_Status of the future according to the PAN training information RAN_Info_1-RAN_Info_t of the past, and may pre-adjust the resource allocation to improve the overall network performance. The embodiment of the present invention adopts LSTM model to predict a future network condition merely because LSTM has a better performance in processing and predicting problems highly correlated to time series, but is not limited thereto. Those skilled in the art may adopt recurrent neural network (RNN) or other suitable AI models according to different requirements. Note that, the embodiment of the present invention adopts the method of continuously training the AI models and thereby predicting the future RAN usage condition, but is not limited thereto. Using an existing AI model to predict directly is also adoptable, and those skilled in the art should make appropriate modifications as needed.

Figure 5:
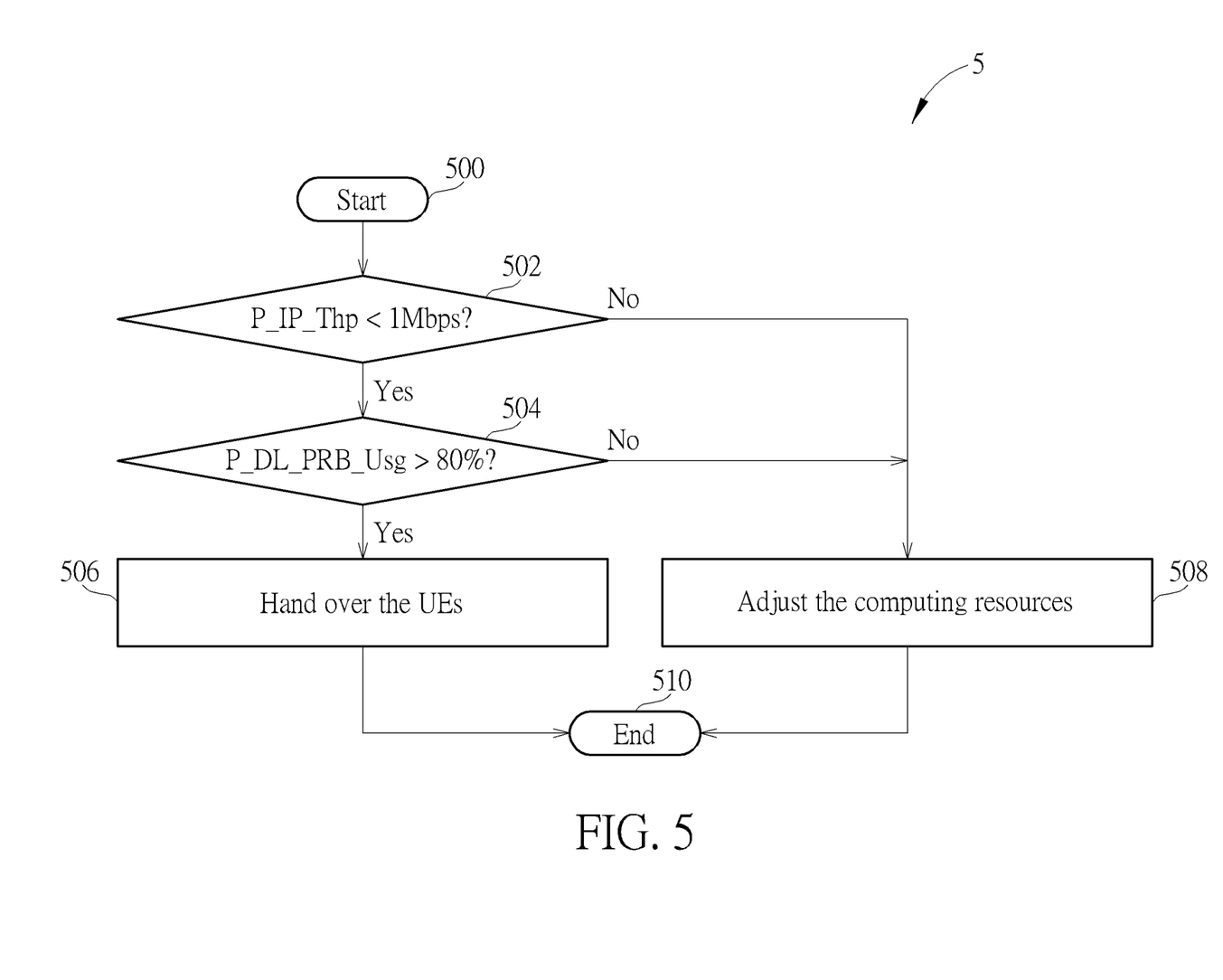
FIG. 5 is a schematic diagram of a process for adjusting RAN resources according to an embodiment of the present invention.

In step 306, after obtaining the RAN predicting information P_RAN_Status of the second time point, the resource adjustment device 26 may pre-adjust the resources of the RAN 2 of the second time point according to the three target features of P_IP_Thp, P_DL_PRB_Usg and P_CPU_Usg in advance at the third time point. Taking the O-RU 20_1 as an example, assuming that the UEs 12_x-12_y among the UEs 12_1-12_s are wirelessly connected to the O-RU 20_1, the resource adjustment device 26 adjusts the resource allocation of the RAN 2 as a process 5 shown in FIG. 5. The process 5 is the process for the resource adjustment device 26 to adjust the resource allocation of the RAN 2 according to the RAN usage condition P_RAN_Status in Step 306, and includes the following steps:

Step 500: Start.

Step 502: Determine whether the predicted value P_IP_Thp of the average IP throughput between the UEs 12_x-12_y and the O-RU 20_1 is less than 1 Mbps. If yes, go to Step 504; otherwise, go to Step 508.

Step 504: Determine whether the predicted value P_DL_PRB_Usg of the average utilization rate of downlink PRB of the O-RU 20_1 for user plane transmission is greater than 80%. If yes, go to Step 506; otherwise, go to Step 508.

Step 506: Hand over one or more of the UEs 12_x-12_y to one or more of the O-RUs 20_2-20_k which are more inactive.

Step 508: Adjust the computing resources of the O_DU 22 or the O-CU 24 according to the predicted value P_CPU_Usg.

Step 510: End.

In detail, taking the O-RU 20_1 as an example, in step 502, when (or in response to that) the predicted value P_IP_Thp of the O-RU 20_1 is greater than 1 Mbps, the resource adjustment device 26 may determine that there will be no network congestion at the second time point (in the future), and then Step 508 is executed to retrieve the possible excess computing resources of the O-DU 22 and the O-CU 24; otherwise, Step 504 is executed to perform further determination.

In Step 504, when (or in response to that) the predicted value P_DL_PRB_Usg of the O-RU 20_1 is also greater than 80%, the resource adjustment device 26 may determine that there will be network congestion at the second time point (in the future) due to insufficient radio resources of the O-RU 20_1, and then execute Step 506 to hand over one or more of the UEs 12_x-12_y to the idle one or more of the O-RUs 20_2-20_k so as to distribute network traffic; otherwise, the resource adjustment device 26 determines that the network congestion is due to insufficient computing resources, and executes Step 508 to increase the computing resources.

The method for adjusting the computing resources of the O-DU 22 or the O-CU 24 in Step 508 is using the Horizontal Pod Autoscaler (HPA) API provided by Kubernetes to adjust the number of Pods (replicas). When more computing resources are required, the number of Pods is increased to support the computations required by the O-DU 22 or the O-CU 24. In contrast, the number of Pods is decreased to retrieve excess resources so as to achieve the purpose of energy saving. The required Pod number may be calculated according to the following equation:

$$predictedReplicas = \text{ceil}\left(currentReplicas \times \frac{predictedCpuUsg}{currentCpsUsg}\right)$$

Where ceil( ) is a ceiling function; predictedReplicas represents the required number of Pods; currentReplicas represents the current number of Pods in operation; predictedCpuUsg represents the predicted value of CPU usage, namely P_CPU_Usg; and currentCpuUsg represents the current CPU usage of the O-DU 22 or the O-CU 24. The information of currentReplicas and currentCpuUsg may be obtained by the O-Cloud platform, and the predictedCpuUsg may be predicted by Step 304. Noteworthily, due to different task allocations for units in the RAN, the amount of data to be processed and the required computing resources for each unit are even more different. Therefore, the required Pod number of the O-DU 22 and the O-CU 24 for operation are different, separate calculations of the Pod number are required so as to adjust resources separately. Adjustments may be required for both of the O-DU 22 and the O-CU 24 at the same time, or for only one of them. In addition, the resource adjustment device 26 may also adjust the resources according to the predicted value of an accelerator usage or other features, and those skilled in the art may make changes according to the method of the present invention to adopt a suitable resource adjustment method.

Noted that, in the embodiment of the present invention, the condition that the predicted value P_IP_Thp of the average IP throughput between the UEs 12_x-12_y and the O-RU 20_1 is less than 1 Mbps in Step 502 is determined to be network congestion; however, the threshold value is not limited to 1 Mbps, and the reasonable conditions should be set according to actual conditions such as network infrastructure and applications. Similarly, in Step 504, the determination of whether the predicted value P_DL_PRB_Usg of the average utilization rate of downlink PRB for user plane transmission is greater than 80% is also not limited to the threshold value of 80%, and a cost-effective and reasonable threshold should be set to meet the needs. Moreover, in Step 506, the method of handing over one or more of the UEs 12_x-12_y to the idle one or more of the O-RUs 20_2-20_k in order to distribute network traffic is also not limited thereto; for example, evenly distributing the number of the UEs to each of the O-RUs, or handing over some of the UEs to the O-RU with the lowest predicted value P_DL_PRB_Usg, etc., are all feasible methods.

Figure 6:
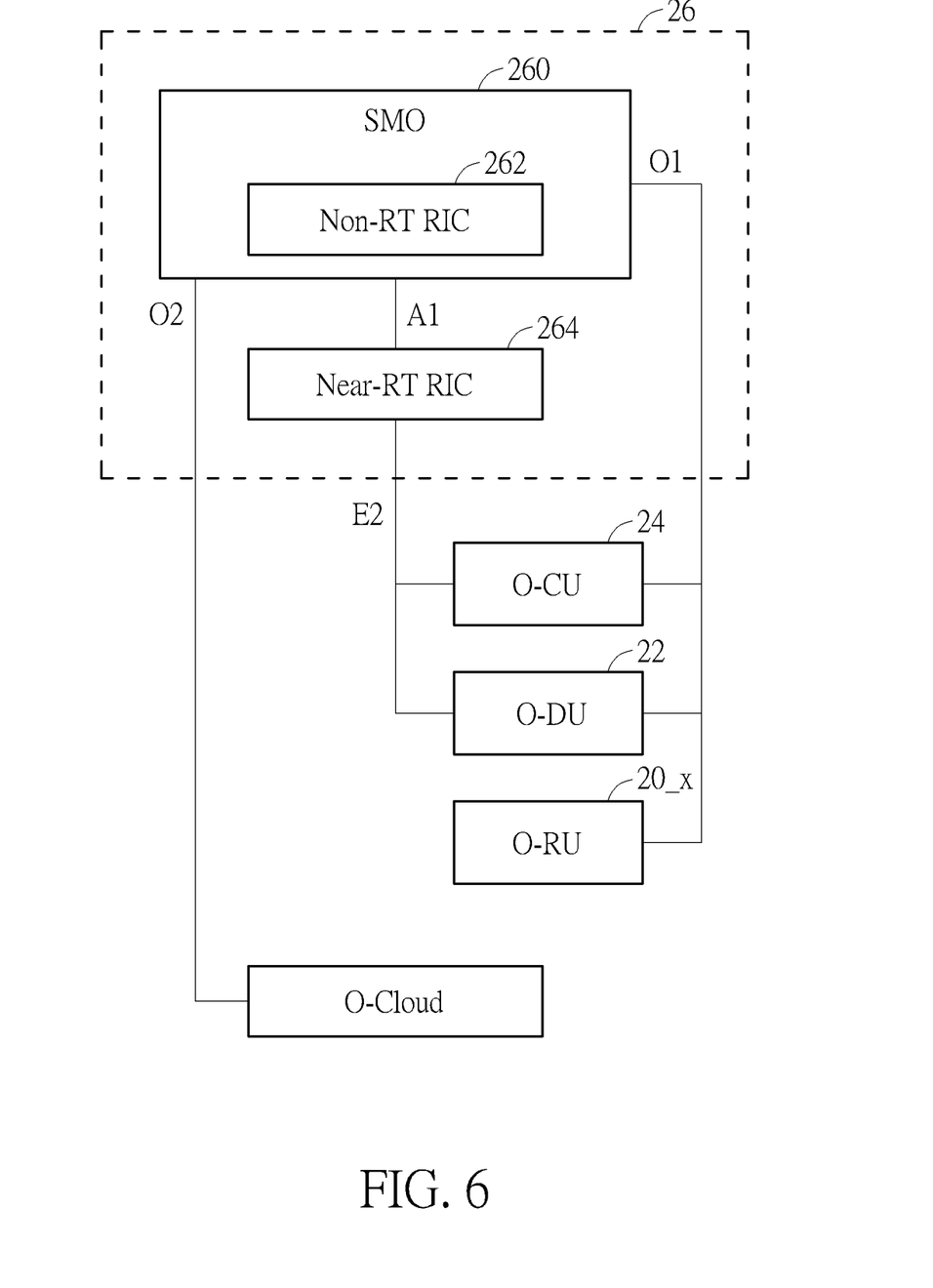
FIG. 6 is a schematic diagram of a logical architecture of a RAN according to an embodiment of the present invention.

FIG. 2 to FIG. 5 are used to expound the spirit of the present invention, and those skilled in the art may make various modifications accordingly, but not limited thereto. For example, in practice, please refer to FIG. 6, which is a schematic diagram of a logical architecture of the PAN 2. For Simplicity, FIG. 6 only shows necessary units and interfaces; for example, an O-RU 20_x represents the plurality of O-RUs 20_1-20_k. The resource adjustment device 26 comprises an SMO 260, a non-RT RIC 262 and a near-RT RIC 264. In one embodiment, the resource adjustment device 26 may obtain the PAN training information RAN_Info_1-RAN_Info_t through the O1 interface in the SMO 260; the non-RT RIC 262 may perform the aforementioned training of the AI models (Steps 302, 304); the information related to the AI models may be transmitted through A1 interface, and the RAN usage condition P_RAN_Status may be predicted in the near-RT RIC 264 (Step 304); and the resource allocation of the RAN 2 may be adjusted according to the process 5 through E2 or O2 interface (Step 306). Note that, the execution of the process 3 is not limited to the method of this embodiment, and so does the deployment of the aforementioned AI models. For example, the step of predicting the RAN usage condition P_RAN_Status (Step 304) may also be performed in non-RT RIC 262 or directly performed in the O-Cloud system, and those skilled in the art may make changes according to requirements under the specifications of O-RAN.

Figure 7:
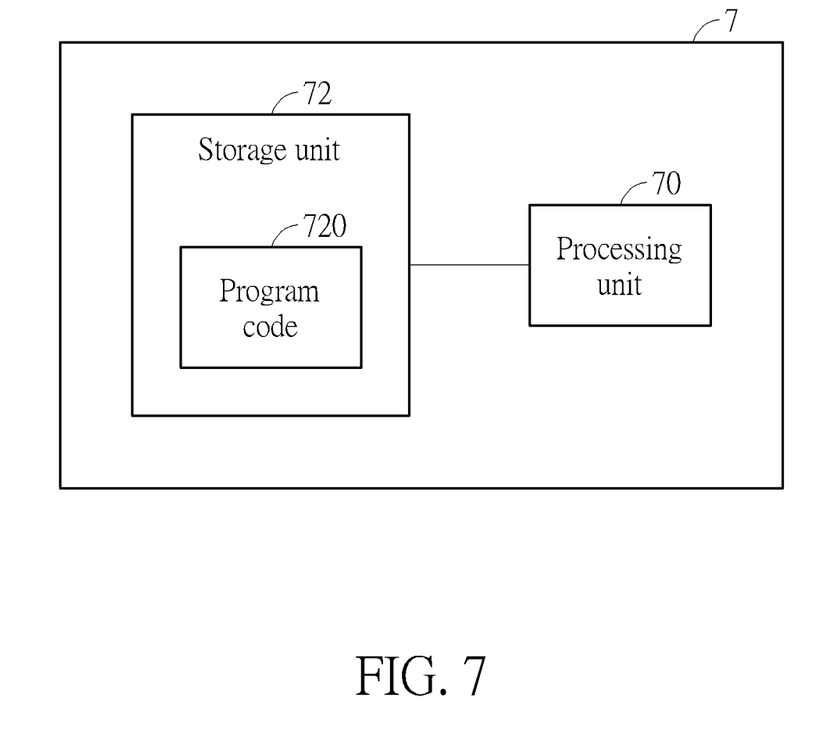
FIG. 7 is a schematic diagram of a communication device according to an embodiment of the present invention.

Furthermore, please refer to FIG. 7, which is a schematic diagram of a communication device 7 according to an embodiment of the present invention. The communication device 7 may implement the resource adjustment device 26, the O-DU 22 or the O-CU 24. As shown in FIG. 7, the communication device 7 complies with the O-RAN specifications, and may be a commercial off-the-shelf (COTS) hardware that implements network functions virtualization (NFV), which comprises a processing unit 70 and a storage unit 72. The processing unit 70 may be a microprocessor or an application-specific integrated circuit (ASIC). The storage unit 72 may be any type of data storage devices for storing a program code 720, and the program code 720 is read and executed by the processing unit 70. For example, the storage unit 72 may be a read-only memory (ROM), a flash memory, a random-access memory (RAM), a hard disk, an optical data storage device, a non-volatile storage unit, etc., and is not limited thereto.

The communication device 7 is used to represent the necessary components required to implement the embodiments of the present invention, and those skilled in the art may make various modifications and adjustments accordingly, and is not limited to this. For example, when the communication device 7 is applied to implement the resource adjustment device 26, the resource adjustment process 3 for RAN may be complied into the program code 720, stored in the storage unit 72, and executed by the processing unit 70. Similarly, when the communication device 7 is applied to implement the O-DU 22 and the O-CU 24, the program code 720 implementing the O-DU 22 and the O-CU 24 may be stored in the storage unit 72 and executed by the processing unit 70 on an O-Cloud platform, and the adjustment of the required resources is performed according to instructions of the resource adjustment device 26.

In summary, the present invention provides a method to self-adaptively adjust RAN resources, which predicts the usage of the network in the future and automatically adjusts the resource allocation. The method not only prevents from network congestion so as to maintain user experience but also achieve the purpose of energy saving, and therefore improves the benefits of the overall network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A resource adjustment method for a radio access network (RAN), wherein the RAN complies with a specification of an open radio access network (O-RAN) of a $5^{th}$ generation mobile communication system (5G) and comprises a plurality of radio units (RU), a distributed unit (DU) and a central unit (CU), the resource adjustment method comprising:
   obtaining a plurality of RAN training information at a first time point;
   predicting a PAN usage condition of a second time point according to the plurality of RAN training information; and
   pre-adjusting a PAN resource allocation of the second time point according to the PAN usage condition at a third time point, so as to allocate a plurality of user equipments (UE) to the plurality of RUs and adjust an arrangement of computing resources of the DU and the CU;
   wherein the first time point is earlier than the third time point, and the third time point is earlier than the second time point.

2. The resource adjustment method of claim 1, wherein the plurality of RAN training information comprise one or more information of a radio resource utilization, a UE throughput, a CPU utilization and an accelerator utilization.

3. The resource adjustment method of claim 1, wherein the step of predicting the RAN usage condition of the second time point according to the plurality of RAN training information comprises:

predicting a RAN predicting information of the second time point according to a first AI model; and predicting the RAN usage condition of the second time point according to a second AI model.

4. The resource adjustment method of claim 3, further comprising:

training the first AI model with the plurality of RAN training information by a first deep learning method; and training the second AI model with the RAN predicting information by a second deep learning method.

5. The resource adjustment method of claim 3, wherein the first AI model is a recurrent neural network (RNN) or a long short-term memory (LSTM).

6. The resource adjustment method of claim 1, wherein the RAN usage condition of the second time point comprises a first feature value, a second feature value and a third feature value, the first feature value is related to a predicted value of an average IP throughput between the user equipments and the RU, the second feature value is related to a predicted value of an average downlink physical resource block (PRB) usage rate, and the third feature value is related to a predicted value of a CPU utility of the DU or the CU.

7. The resource adjustment method of claim 6, wherein the step of pre-adjusting the RAN resource allocation of the second time point according to the RAN usage condition at the third time point comprises:

in response to the first feature value being smaller than a first threshold and the second feature value being larger than a second threshold, equally distributing the plurality of user equipments among the plurality of RUs;

in response to the first feature value being larger than the first threshold, respectively adjusting a computing resource of the CU or the DU according to a ratio of the third feature value to the CPU utility of the third time point; and in response to the second feature value being smaller than the second threshold, respectively adjusting a computing resource of the CU or the DU according to a ratio of the third feature value to the CPU utility of the third time point.

8. A resource adjustment device for a radio access network (RAN), wherein the RAN complies with a specification of an open radio access network (O-RAN) of a $5^{th}$ generation mobile communication system (5G) and comprises a plurality of radio units (RU), a distributed unit (DU) and a central unit (CU), the resource adjustment device comprising:

a processing unit, configured to execute a program code; and a storage unit, coupled to the processing unit to store the program code, wherein the program code is configured to instruct the processing unit to execute a resource adjustment method, the resource adjustment method comprises:

obtaining a plurality of RAN training information at a first time point;

predicting a PAN usage condition of a second time point according to the plurality of RAN training information; and pre-adjusting a PAN resource allocation of the second time point according to the RAN usage condition at a third time point, so as to allocate a plurality of user equipments (UE) to the plurality of RUs and adjust an arrangement of computing resources of the DU and the CU;

wherein the first time point is earlier than the third time point, and the third time point is earlier than the second time point.

9. The resource adjustment device of claim 8, wherein the plurality of RAN training information comprise one or more information of a radio resource utilization, a UE throughput, a CPU utilization and an accelerator utilization.

10. The resource adjustment device of claim 8, wherein the step of predicting the RAN usage condition of the second time point according to the plurality of RAN training information comprises:

predicting a RAN predicting information of the second time point according to a first AI model; and predicting the RAN usage condition of the second time point according to a second AI model.

11. The resource adjustment device of claim 10, wherein the resource adjustment method further comprises:

training the first AI model with the plurality of RAN training information by a first deep learning method; and training the second AI model with the RAN predicting information by a second deep learning method.

12. The resource adjustment device of claim 10, wherein the first AI model is a recurrent neural network (RNN) or a long short-term memory (LSTM).

13. The resource adjustment device of claim 8, wherein the RAN usage condition of the second time point comprises a first feature value, a second feature value and a third feature value, the first feature value is related to a predicted value of an average IP throughput between the user equipments and the RU, the second feature value is related to a predicted value of an average downlink physical resource block (PRB) usage rate, and the third feature value is related to a predicted value of a CPU utility of the DU or the CU.

14. The resource adjustment device of claim 13, wherein the step of pre-adjusting the RAN resource allocation of the second time point according to the RAN usage condition at the third time point comprises:

in response to the first feature value being smaller than a first threshold and the second feature value being larger than a second threshold, equally distributing the plurality of user equipments among the plurality of RUs; and in response to the first feature value being larger than the first threshold or the second feature value being smaller than the second threshold, respectively adjusting a computing resource of the CU or the DU according to a ratio of the third feature value to the CPU utility of the third time point.

15. A radio access network (RAN), wherein the RAN complies with a specification of an open radio access network (O-RAN) of a $5^{th}$ generation mobile communication system (5G), and comprises:

a plurality of radio units (RUs);

a distributed unit (DU), running on a first O-Cloud platform;

a central unit (CU), running on a second O-Cloud platform; and a resource adjustment device, configured to execute a resource adjustment method for the radio access network, the resource adjustment method comprises:

obtaining a plurality of RAN training information at a first time point;

predicting a PAN usage condition of a second time point according to the plurality of RAN training information; and pre-adjusting a PAN resource allocation of the second time point according to the PAN usage condition at a third time point, so as to allocate a plurality of user equipments (UE) to the plurality of RUs and adjust an arrangement of computing resources of the DU and the CU;

wherein the first time point is earlier than the third time point, and the third time point is earlier than the second time point.

16. The radio access network of claim 15, wherein the plurality of RAN training information comprise one or more information of a radio resource utilization, a UE throughput, a CPU utilization and an accelerator utilization.

17. The radio access network of claim 15, wherein the step of predicting the RAN usage condition of the second time point according to the plurality of RAN training information comprises:

training a first AI model with the plurality of RAN training information by a first deep learning method;

predicting a RAN predicting information of the second time point according to the first AI model;

training a second AI model with the RAN predicting information by a second deep learning method; and predicting the RAN usage condition of the second time point according to the second AI model.

18. The radio access network of claim 17, wherein the first AI model is a recurrent neural network (RNN) or a long short-term memory (LSTM).

19. The radio access network of claim 15, wherein the RAN usage condition of the second time point comprises a first feature value, a second feature value and a third feature value, the first feature value is related to a predicted value of an average IP throughput between the user equipments and the RU, the second feature value is related to a predicted value of an average downlink physical resource block (PRB) usage rate, and the third feature value is related to a predicted value of a CPU utility of the DU or the CU.

20. The radio access network of claim 19, wherein the step of pre-adjusting the RAN resource allocation of the second time point according to the RAN usage condition at the third time point comprises:

in response to the first feature value being smaller than a first threshold and the second feature value being larger than a second threshold, equally distributing the plurality of user equipments among the plurality of RUs;

in response to the first feature value being larger than the first threshold, respectively adjusting a computing resource of the CU or the DU according to a ratio of the third feature value to the CPU utility of the third time point; and in response to the second feature value being smaller than the second threshold, respectively adjusting a computing resource of the CU or the DU according to a ratio of the third feature value to the CPU utility of the third time point.

* * * * *